Aug. 4, 1959     B. SCHROUGHAM     2,897,798
ROTARY INTERNAL COMBUSTION ENGINE
Filed July 2, 1956     4 Sheets-Sheet 1

INVENTOR.
BENTON SCHROUGHAM
BY: Harold B. Hood,
ATTORNEY

Aug. 4, 1959

B. SCHROUGHAM 2,897,798

ROTARY INTERNAL COMBUSTION ENGINE

Filed July 2, 1956

INVENTOR.
BENTON SCHROUGHAM
BY: Harold B. Hood,
ATTORNEY

Aug. 4, 1959 B. SCHROUGHAM 2,897,798
ROTARY INTERNAL COMBUSTION ENGINE
Filed July 2, 1956 4 Sheets-Sheet 3
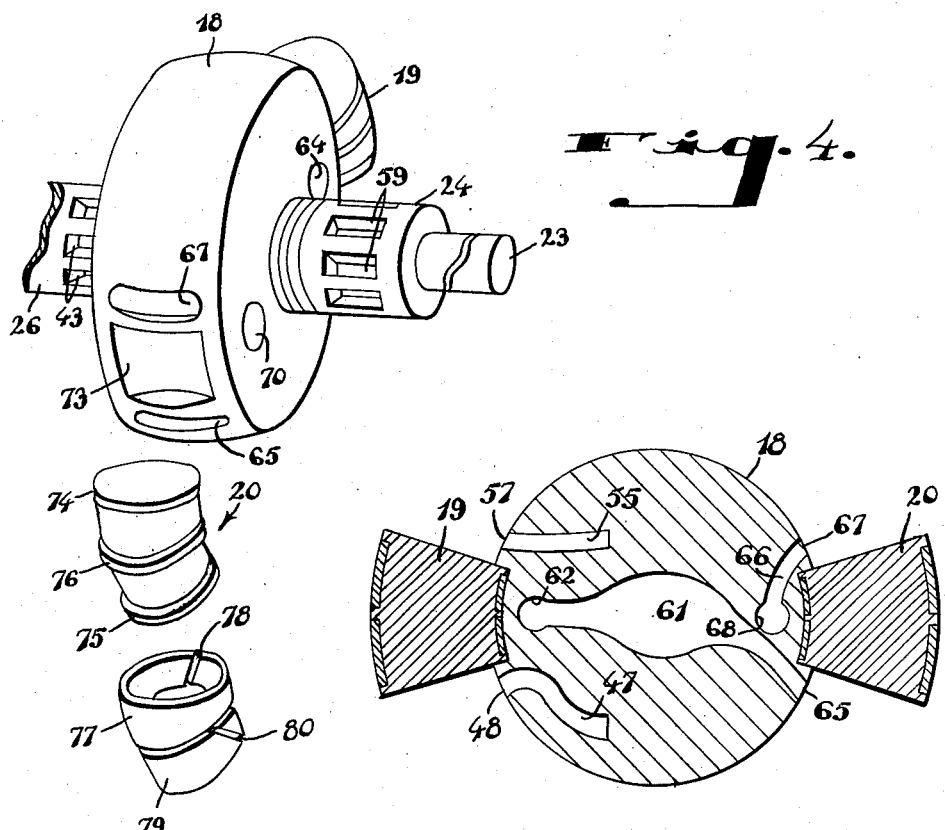
Fig. 4.
Fig. 5.
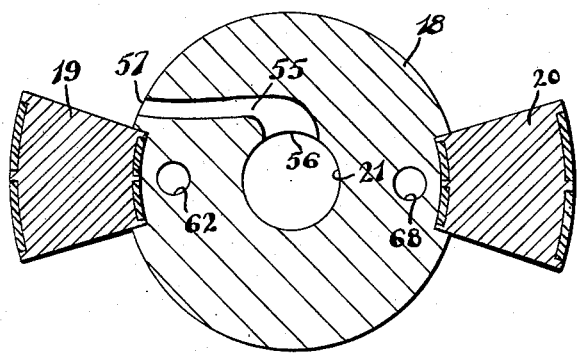
Fig. 6.
INVENTOR.
BENTON SCHROUGHAM
BY: Harold B. Hood,
ATTORNEY

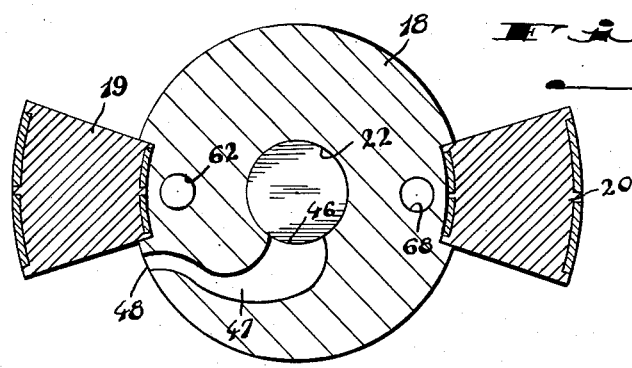
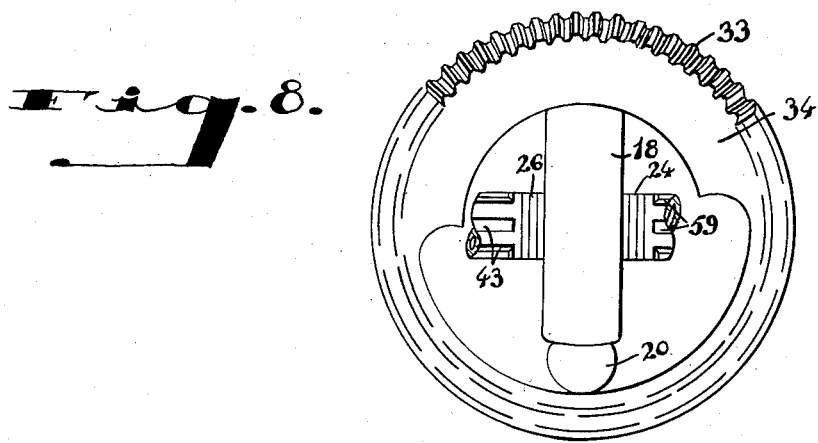
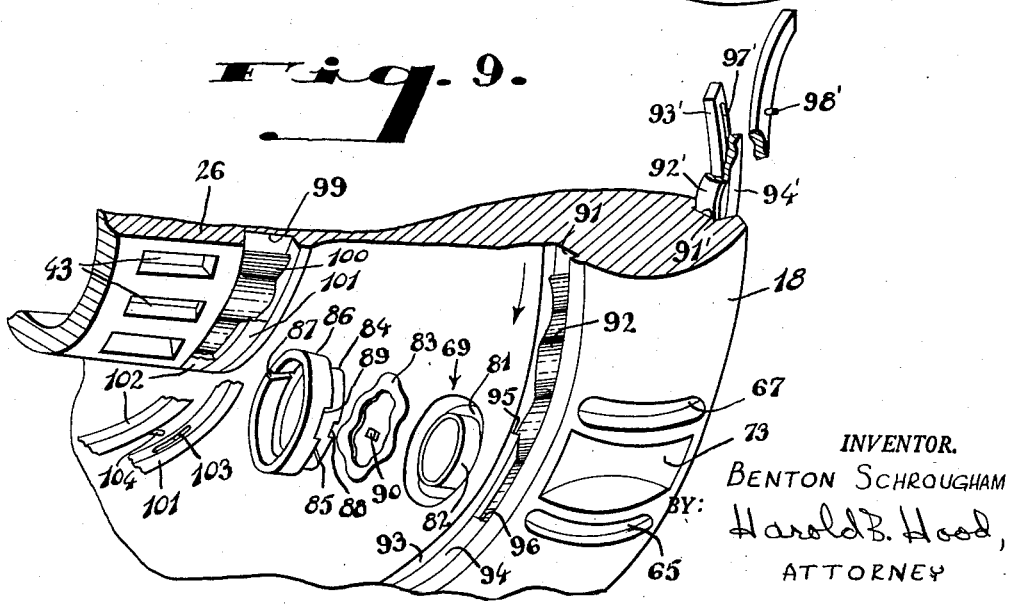
INVENTOR.
BENTON SCHROUGHAM
BY: Harold B. Hood,
ATTORNEY

United States Patent Office 2,897,798
Patented Aug. 4, 1959

2,897,798

ROTARY INTERNAL COMBUSTION ENGINE

Benton Schrougham, Beech Grove, Ind.

Application July 2, 1956, Serial No. 595,513

16 Claims. (Cl. 123—13)

The present invention relates to a rotary internal combustion engine, and its primary object is to provide such an engine, improved and simplified over similar devices which have heretofore been known.

More particularly, it is a major object of the present invention to provide, in such an engine, a rotor carrying a pair of diametrically-opposed pistons, the rotor itself being formed with passages designed to cooperate with ports in the block in which the rotor is mounted, in such a fashion that one piston draws a fuel charge into an annular piston chamber twice in each cycle of the rotor, and concurrently scavenges spent gases from the piston chamber; while the other piston compresses a fuel charge into a combustion chamber twice in each rotor cycle, and concurrently receives an impulse from the explosion of fuel in a previously-charged combustion chamber.

A further important object of the invention is to provide improved shutter means, driven from the rotor, for cyclically dividing the annular piston chamber into separate compartments, while opening that chamber, in timed relation to the piston travel, to permit both pistons to move freely throughout the peripheral extent of the piston chamber.

Still further objects, relating to the proper sealing of ports and passages in the engine, and to other matters, will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 4 is an exploded perspective of the rotor and fragments of its associated shaft sections, illustrating one of the pistons removed from the rotor and with its sealing rings removed from the piston;

Fig. 5 is a section taken through the median plane of the rotor perpendicular to the rotor axis;

Fig. 6 is a section taken on a plane parallel to the plane of Fig. 5 but cutting the rotor socket in which is received the engine output shaft;

Fig. 7 is a section taken on a plane parallel to the plane of Fig. 5 but cutting the rotor socket in which is received the engine timer shaft;

Fig. 8 is a plan view of the upper shutter, the rotor and portions of the shafts, drawn to a scale somewhat smaller than the scale of Fig. 3; and Fig. 9 is a fragmental perspective of a portion of the rotor and one of the shafts, illustrating the optimum sealing ring means contemplated for use in the preferred form of the present invention.

Figure 1:
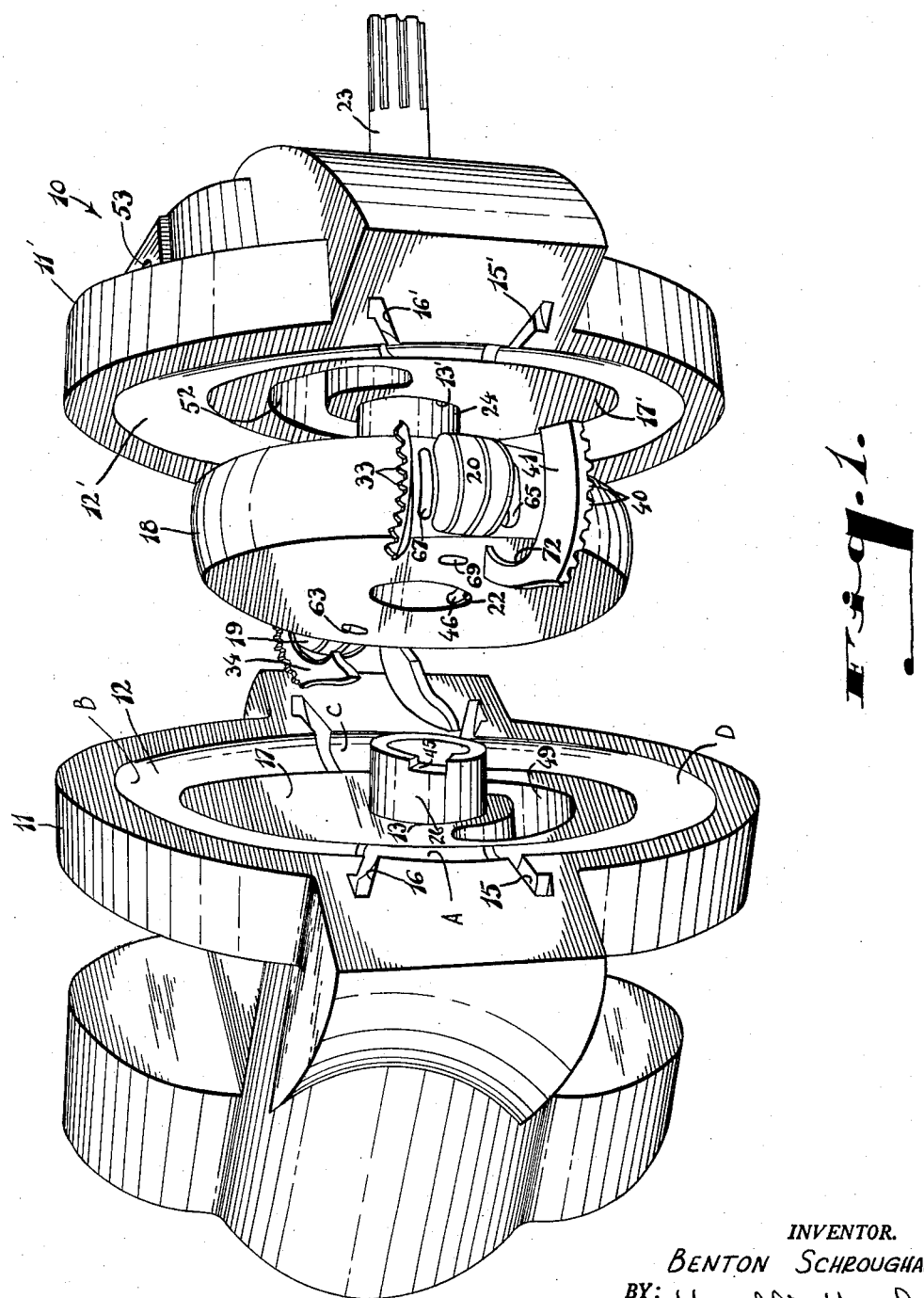
Fig. 1 is an exploded, perspective view of an engine constructed in accordance with the present invention, and showing the rotor chamber and piston chamber split on a median plane, with the piston-carrying rotor suspended between the two sections of the block, substantially in its operative relation to the block, and showing broken sections of the shutters.

Referring more particularly to the drawings, it will be seen that I have illustrated block means, indicated generally by the reference numeral 10, and which is shown as split into sections 11 and 11'. I presently believe that it will be advantageous actually to split the block substantially on the illustrated dividing plane, and to secure the sections 11 and 11' together in any suitable fashion.

A continuous, annular piston chamber is formed by mating channels 12 and 12' in the two sections, said channels being concentric with bores 13 and 13' formed in the block means, the bore 13' having a reduced outer end portion 14 for a reason which will become apparent.

A continuous slot or channel 15, formed upon an axis perpendicular to the common axis of the bores 13 and 13' and spaced therebelow, intersects the piston chamber at two points, in separate quadrants thereof; and a similar channel 16 is formed in the block means, coaxial with the channel 15 and equally spaced above the axis of the bores 13 and 13'.

Figure 2:
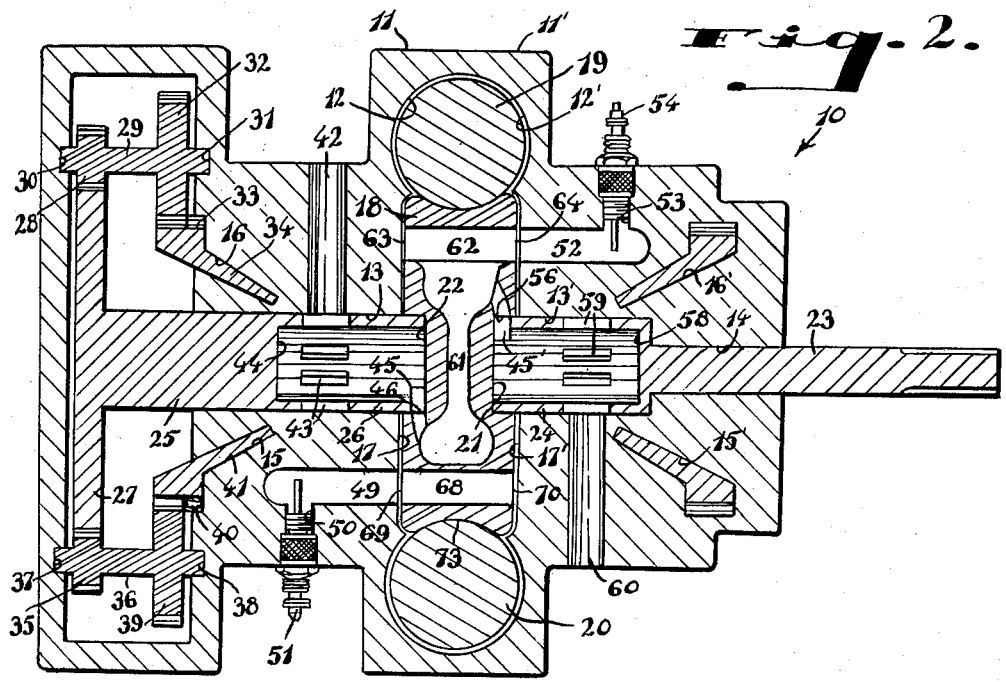
Fig. 2 is a longitudinal section through the engine, showing the rotor in a position advanced through approximately 90° with respect to its position of Fig. 1.
Figure 3:
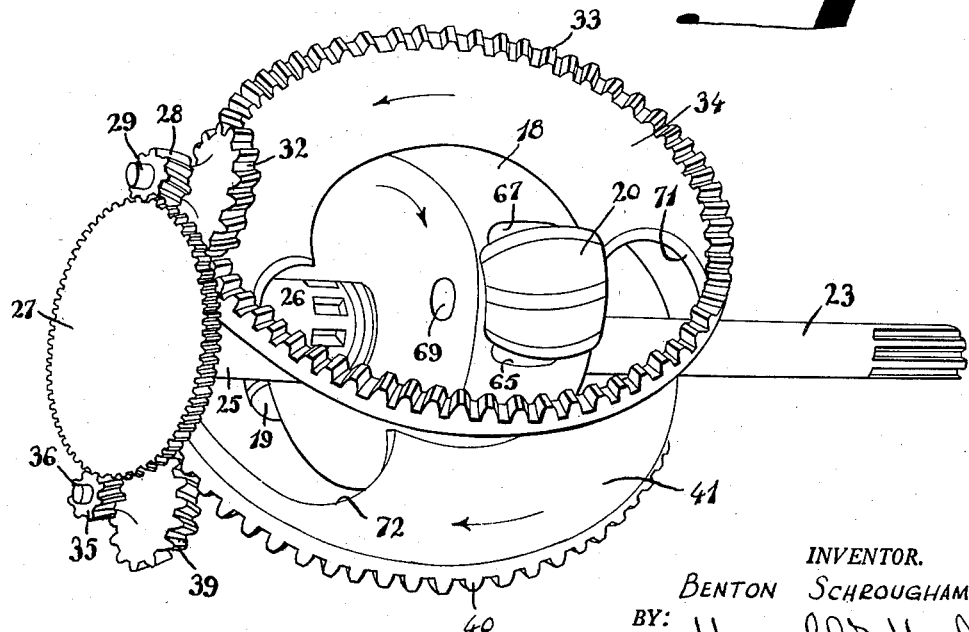
Fig. 3 is a perspective view of the rotor, the shutters and the driving means for the shutters, showing the rotor in a position approximately 30° behind its position of Fig. 1.

A rotor chamber, concentric with the bores 13 and 13', is defined between spaced lands 17 and 17', and is circumscribed by the piston chamber which, as is most clearly seen in Fig. 2, opens into the rotor chamber. A discoid rotor 18 is rotationally mounted in said rotor chamber.

Upon its periphery, the rotor 18 carries two pistons 19 and 20, at substantially diametrically opposite points, said pistons being supported to travel in the annular piston chamber defined by the channels 12 and 12'.

In its opposite end faces, the piston 18 is formed with outwardly-opening, axial sockets 21 and 22. A first shaft 23, sometimes referred to as an output shaft, is journalled in the bore extension 14 and has an enlarged, chambered end 24 which is journalled in the bore 13', the extremity of said end 24 being snugly and non-rotationally received in the socket 21 of the rotor 18. A second shaft 25, sometimes referred to as a timer shaft, is journalled in the bore 13 and is formed with a chambered end section 26, the extremity of which is snugly and non-rotationally received in the rotor socket 22.

At its outer end, and disposed in a suitable chamber in the block means 10, the shaft 25 carries a gear 27. A pinion 28, fixed to a countershaft 29, whose opposite ends are suitably journalled as at 30 and 31 in sockets formed in the block means 10, meshes with the gear 27. A gear 32, fixed to the countershaft 29, meshes with a tooth series 33 formed on the periphery of an upper shutter 34 mounted for rotation in the channel 16.

A second pinion 35, fixed to a second countershaft 36 whose opposite ends are journalled, as at 37 and 38, in suitable sockets formed in the block means 10, likewise meshes with the gear 27. A further gear 39, fixed to the countershaft 36, meshes with a tooth series 40 on the periphery of a lower shutter 41 mounted in the channel 15. The pitch diameters of the several gears and pinions of each of the above-described driving trains between the shaft 25 and the shutters 34 and 41, respectively, are such as to provide a two-to-one ratio, whereby the shutters 34 and 41 will be driven, in opposite directions, at angular velocities twice that of the rotor 18.

A fuel-intake port or passage 42 is formed in the block means 10 and opens into the bore 13; and the section 26 of the shaft 25 is formed with a peripheral series of slots 43 registering with the passage 42 to provide continuous, open communication between the intake passage 42 and the chamber 44 formed in said shaft section, during rotation of the shaft. The extremity of the shaft section 26 is notched or ported as at 45 to register with the mouth 46 of a passage 47 (see Figs. 5 and 7) formed in the rotor 18 and opening through the periphery of the rotor at 48 immediately behind the piston 19.

A combustion chamber 49 (Figs. 1 and 2) is formed in the block means 10 and is provided with a peripherally-elongated mouth opening through the land 17 and having a peripheral extent slightly less than 180°. A tapped bore 50 opens exteriorly of the block means 10 and into the chamber 49 for the reception of an ignition device 51 (Fig. 2).

In a diametrically opposed quadrant, the block means 10 is formed with a second combustion chamber 52 having a peripherally elongated mouth opening through the land 17′ and having a peripheral extent slightly less than 180°, the chamber 49 and 52 being so proportioned and related that they do not overlap. A tapped bore 53 opens to the exterior of the block means 10 and into the chamber 52 for the reception of an ignition device 54.

At a point 180° removed from the passage mouth 46, the extremity of the shaft section 24 is notched or ported to register with the mouth 56 of a passage 55 (Figs. 5 and 6) formed in the rotor 18, the opposite end of the passage 55 opening, at 57, through the periphery of the rotor at a point immediately ahead of the piston 19. Communication is thus provided between the piston chamber and the interior of the chamber 58 in the shaft section 24. Said shaft section is formed with a peripheral series of ports 59 registering with an exhaust passage or port 60 in the block means 10, whereby the piston chamber, at a point immediately ahead of the piston 19, is always in open communication with the exhaust passage 60.

A further passage 61 (Figs. 2 and 5) opens at one end into an axially-extending passage 62 which, in turn, opens at its opposite ends, in ports 63 and 64, through the opposite end faces of the rotor 18; and said ports 63 and 64 are so spaced from the axis of the rotor that, as the rotor turns, those ports alternately register with the mouths of the combustion chambers 49 and 52. As has been explained, those chamber mouths are so proportioned and arranged that, when the port 63 registers with the mouth of the combustion chamber 49, the port 64 is sealed against the land 17′; and when the port 64 registers with the mouth of the combustion chamber 52, the port 63 is sealed against the land 17.

The opposite end of the passage 61 opens, at 65, through the periphery of the rotor 18 immediately ahead of the piston 20.

A further passage 66 in the rotor 18 opens at 67 through the periphery of the rotor at a point immediately behind the piston 20; and said passage 66 communicates, at its inner end, with an axially extending passage 68 which, at its opposite ends, opens in ports 69 and 70 through the opposite end faces of the rotor 18. The ports 69 and 70 are so located that they communicate, alternately, with the mouths of the combustion chambers 49 and 52; and, as is most clearly to be seen in Fig. 2, the port 69 will register with the mouth of the chamber 49 when the port 64 registers with the mouth of the chamber 52, and while the ports 63 and 70 are sealed against the lands 17 and 17′, respectively; and the port 70 will register with the mouth of the chamber 52 when the port 63 registers with the mouth of the chamber 49, while the ports 69 and 64 are sealed against the lands 17 and 17′, respectively.

The shutter 34 is formed with a peripherally-elongated port or aperture 71 therethrough, having a peripheral extent slightly exceeding 180°; and the shutter 41 is formed with a similar aperture or port 72 therethrough. As the shutters 34 and 41 rotate, these apertures 71 and 72 move into and out of registry with the piston chamber, in the two regions in which each of the shutters intersects that chamber. The parts are so proportioned and designed that, just after the piston 20, for instance, has passed downwardly through the aperture 71 of the shutter 34, the trailing end of that aperture will move out of the piston chamber, to close the chamber behind the piston. At the same time, the leading end of the aperture 72 of the shutter 41, moving in the opposite direction, comes into registry with the piston chamber to permit the passage of the piston 20 downwardly therethrough.

As the aperture 72 clears the path of the piston 20, the trailing end of that aperture closes immediately behind the piston 19, which is ascending; and the leading end of the aperture 71 through the shutter 34 comes into registry with the piston passage to permit the ascending piston 19 to pass therethrough.

For convenience in description, the forward portion of the piston passage between the shutters 34 and 41 has been designated (Fig. 1) as section A; the portion above the shutter 34 has been designated section B; the rearward section of the piston passage between the two shutters has been designated section C; and the portion of the piston passage below the shutter 41 has been designated section D.

Operation

As the piston 19 moves upwardly from its position of Fig. 1, the shutter 34 closes behind it whereby, as the piston 19 moves through the passage section B, it tends to draw a vacuum behind it. Thus, fuel is drawn into that passage section through the intake port 42, ports 43, chamber 44, port 45, mouth 46 and passage 47 and port 48 (Figs. 2 and 7). When the piston 19 moves downwardly through the port 71 in the shutter 34, into the passage section A, the shutter 34 closes behind piston 19 to entrap the fuel in section B.

As piston 19 moves from section A into section D, shutter 41 closes behind it, and again it acts to draw fuel, through the path above-described, behind it into the section D, where that fuel charge is entrapped, as piston 19 moves into section C.

While piston 19 thus travels through section D, piston 20 is travelling through section B, pressing upon the charge of fuel left therein behind piston 19, and forcing that charge to flow, through port 65, passage 61 and passage 62, and through port 63 which now registers with the mouth of combustion chamber 49, into said combustion chamber, where the fuel charge is thus compressed.

As piston 19 moves again into section B to draw a new charge of fuel thereinto, port 69 moves into registry with the mouth of the combustion chamber 49. Ignition device 51 is now energized to ignite the fuel charge in chamber 49; and the gases resulting from that combustion rush through port 69, passage 68, passage 66 and port 67 into section D behind piston 20 to drive the rotor. At the same time, the charge entrapped in section D ahead of piston 20 is driven through port 65, passage 61, passage 62 and port 64 into combustion chamber 52, where it is compressed.

Now, as piston 20 moves again into section B, ignition device 54 is energized to ignite the fuel charge therein; and the expanding gases rush through port 70, passage 68 and port 67 to deliver an impulse behind the piston 20. At the same time, the piston 19, moving through the passage D, encounters the spent gases entrapped therein as the piston 20 moves into section C; and forces those gases, ahead of itself, through port 57, passage 55, passage 56, chamber 58, and ports 59 to the exhaust passage 60.

Sealing

Obviously, more than two pistons may be used in an engine of the character here under consideration, in which case, appropriate modifications in the chamber means and passage means of the engine will be provided. The pistons may be formed integrally with the rotor, or they may be attached thereto in any suitable fashion; but I prefer to use the mode of association illustrated in the present drawings, wherein, and particularly in Fig. 4, I have shown the peripheral surface of the rotor formed with a relatively shallow socket 73 for the reception of each of the pistons. Because the pistons are guided, in their travel through the piston chamber, by engagement with the chamber walls, I prefer that they shall be restrained against movement with respect to the rotor, only in peripheral directions, being free to move slightly, in radial directions, relative to the rotor.

As is most clearly shown in Fig. 4, each piston is cylindrical in transaxial section, and its axis is curved upon a circular arc concentric with the rotor. In the preferred form, each piston is provided, adjacent its opposite ends, with outstanding ribs 74 and 75 and with a central rib 76, said ribs defining channels in which are received sealing rings 77 and 79. Each of said rings is split, as at 78 and 80, and each ring is of continuously-varying axial length, as illustrated, to conform to the shapes of the channels defined between the rib 76 and the ribs 74 and 75, as enforced by the axially-curved shape of the piston. As will be clear from an inspection of Fig. 4, the splits 78 and 80 in the respective rings 77 and 79 are angularly offset with respect to each other; and it will be clear that the splits in the respective rings cannot move into registry with each other, since the shapes of the rings, and of the channels in which they are seated, affirmatively retain the rings against rotational movement about their own axes. The thickness of the rings, of course, is minutely greater than the height of the ribs 74, 75 and 76, so that the rings 77 and 79, rather than the pistons themselves, bear upon the walls of the piston chamber.

Suitable bearing means and fluid-sealing means will, of course, be provided between the relatively-rotatable elements of the engine. While conventional means can be used for such purposes, I have illustrated, and shall now describe, what I presently conceive to be optimum fluid-sealing means for the various parts of the engine.

In Fig. 9, I have illustrated a preferred sealing means to be used in association with each of the ports 63, 64, 69 and 70. Thus, the port 69 is circumscribed by an annular groove 81 separated from the boundary of the port by a relatively thin-walled spud 82. A sinuous spring ring 83 is proportioned and designed to be seated upon the floor of the groove 81 in encircling relation to the spud 82. A ring 84 having a split 85 therein sleeves snugly upon the spud 82; and a second ring 86 having a split 87 therein sleeves snugly upon the ring 84 and fits snugly within the outer periphery of the groove 81, the two rings 84 and 86 being supported upon the spring ring 83, and the outer ends of said split rings normally projecting slightly beyond the end surface of the rotor 18, under the influence of the spring ring 83. In its inner end, the ring 84 is formed with a notch 88, and in its corresponding end, the ring 86 is formed with a notch 89, the distance between the notch 88 and the split 85 in its ring being substantially different from the distance between the notch 89 and the split 87 in its ring. A block or key 90, resting on the spring ring 83, engages in both notches 88 and 89, thus limiting the degree to which the rings 84 and 86 may rotate relative to each other, and preventing the splits 85 and 87 in the respective rings from coming into registry. Preferably, at least one of the notches 88 and 89 has a peripheral extent greater than the peripheral dimension of the block 90, so that such limited relative rotation between the rings may occur.

Each end face of the rotor 18 is formed, near the external periphery of the rotor, with a continuous groove such as 91 or 91'. A sinuous spring ring 92 or 92' is seated in the bottom of each of these grooves. Supported upon spring ring 92 is a split sealing ring 93 which bears against the radially inner wall of the groove 91; and a second, similar split sealing ring 94 is similarly supported in the groove 91, bearing against the radially outer wall of the groove and against the adjacent face of the ring 93. The split in the ring 93 is formed in such a direction that the trailing end of the ring is bevelled with its sharpened edge 95 facing away from the direction of rotation of the rotor; and the same thing is true of the sharpened edge 96 of the trailing end of the ring 94.

Similar rings 93' and 94' are mounted in the groove 91'; and the parts are so proportioned and designed that the spring rings 92 and 92' normally hold the sealing rings 93 and 94 and 93' in positions projecting slightly beyond the corresponding end faces of the rotor 18, so that the sealing rings, rather than the end faces of the rotor, bear against the lands 17 and 17'.

It is desirable to permit some rotational movement of the rings 93 and 94, and of the rings 93' and 94', relative to each other; yet it is desirable to prevent the splits in the adjacent rings from coming into mutual registry. To that end, I provide means, illustrated in the upper right-hand portion of Fig. 9, to provide for limited relative movement between the rings of each pair. Thus, I have shown a peripherally-elongated slot or socket 97' in that face of the ring 93' which is presented toward the ring 94'; and I have shown a pin 98' projecting from the mating face of the ring 94' and engaging in the slot 97', the pin 98' being spaced from the split in the ring 94' a distance different from the distance between the split in the ring 93' and any point in the length of the slot 97'. A similar restraining means (not shown) is provided in the rings 93 and 94. It will be obvious that I have shown a fragment of the ring 94' broken away and inverted, in order more clearly to illustrate the specific arrangement of the pin 98'.

In that region of each of the shaft sections 24 and 26 intermediate its ports 43 or 59 and its extremity which is received in the socket 22 or 21, the shaft section is formed with a peripheral groove 99. A sinuous spring ring 100 is seated in the bottom of each such groove, and a pair of split sealing rings 101 and 102 is disposed, in axial side by side relation, in each such groove and upon the ring 100. As in the case of the rings 93 and 94, the rings 101 and 102 are so arranged that their sharpened edges, at their splits, face away from the direction of rotation of the rotor and the associated shaft sections. I have shown broken fragments of the rings 101 and 102 illustrating means whereby I provide for some relative rotational movement of said rings, but limit such movement to prevent registration of the splits in the two rings. Thus, I have shown a peripherally-elongated slot 103 in the ring 101 receiving a pin 104 projecting from the ring 102.

I claim as my invention:
1. A rotary internal combustion engine comprising block means formed to provide an annular piston chamber, a rotor journalled for rotation about the axis of said chamber, a plurality of pistons carried by said rotor and peripherally spaced thereon, said pistons being arranged to travel in said annular chamber, said block means being formed with a first combustion chamber normally closed by one end face of said rotor and with a second combustion chamber normally closed by the opposite end face of said rotor, a first shutter mounted for rotation about an axis perpendicular to the axis of said rotor and intersecting said annular chamber at two points, a second shutter mounted for rotation in coaxial relation to said first shutter and intersecting said annular chamber at two other points, said shutters being disposed, respectively, at opposite sides of the axis of said rotor, said block means being provided with a fuel intake port and with an exhaust port for spent gases, and said rotor being formed to provide: a first passage always in communication with said intake port and with said annular chamber immediately behind one of said pistons, a second passage always in communication with said exhaust port and with said annular chamber immediately ahead of said one piston, a third passage alternately in communication with said combustion chambers and always in communication with said annular chamber immediately ahead of another of said pistons, and a fourth passage alternately in communication with said combustion chambers in reverse order with respect to said third passage and always in communication with said annular chamber immediately behind said other piston; each of said shutters being formed with a peripherally-elongated port therethrough, and means providing a driving connection between said rotor and said shutters to rotate the shutters in timed relation to said rotor to open said annular chamber for passage of said pistons and to define a closed compartment behind each piston and a closed compartment ahead of each piston during a part of each cycle of said rotor.

2. A rotary internal combustion engine comprising block means formed to provide an annular piston chamber of uniform cross section throughout its peripheral extent, a rotor journalled for rotation about the axis of said chamber, a pair of pistons mounted on said rotor in opposed relation to travel in said annular chamber, a pair of rotatable shutters, each having an aperture therein which traverses said piston chamber at two points in opposed quadrants of said piston chamber in timed relation to the travel of said pistons to permit successive passage of said pistons therethrough, each such aperture having a peripheral extent exceeding 180°, said shutters and the apertures therein being so proportioned and spaced apart that, as the trailing end of the aperture in one of said shutters leaves one quadrant of said piston chamber, its leading end enters the opposed quadrant thereof, while the leading end of the aperture in the other shutter enters said one quadrant and its trailing end leaves said opposed quadrant, and means connecting said rotor to drive said shutters in such timed relation.

3. A rotary internal combustion engine comprising block means formed to provide an annular piston chamber, a rotor journalled for rotation about the axis of said chamber, a pair of pistons mounted on said rotor in opposed relation to travel in said annular chamber, a pair of rotatable shutters, each having an aperture therein which traverses said piston chamber at two points in opposed quadrants of said piston chamber in timed relation to the travel of said pistons to permit successive passage of said pistons therethrough, each such aperture having a peripheral extent exceeding 180°, said shutters and the apertures therein being so proportioned and spaced apart that, as the trailing end of the aperture in one of said shutters leaves one quadrant of said piston chamber, its leading end enters the opposed quadrant thereof, while the leading end of the aperture in the other shutter enters said one quadrant and its trailing end leaves said opposed quadrant, and means connecting said rotor to drive said shutters in opposite directions at an angular velocity twice that of said rotor.

4. A rotary internal combustion engine comprising block means formed to provide a rotor chamber defined between mutually-facing, parallel lands, and to define an annular piston chamber circumscribing, and peripherally communicating with, said rotor chamber, a rotor received in said rotor chamber for coaxial rotation therein and having opposed end faces cooperatively disposed with respect to said lands, a pair of pistons secured to the periphery of said rotor at substantially diametrically-opposed points and disposed in said piston chamber, said block means being formed to provide a first combustion chamber having a peripherally-elongated mouth opening through one of said lands and concentric with said rotor, and to provide a second combustion chamber having a peripherally-elongated mouth opening through the other of said lands, in non-overlapping, angularly-offset relation to the mouth of said first combustion chamber and concentric with said rotor, said block means further being formed to provide a fuel intake port and an exhaust port for spent gases, means providing a constantly-open passage between said intake port and said piston chamber immediately behind one of said pistons, means providing a constantly-open passage between said piston chamber immediately ahead of said one piston and said exhaust port, said rotor being formed with a passage therein leading from a point on the periphery of said rotor immediately ahead of the other of said pistons to two ports respectively opening through the opposite end faces of said rotor and alternatively registrable with the mouths of said combustion chambers as said rotor rotates, said rotor further being formed with a further passage therein leading from a point on the periphery of said rotor immediately behind said other piston to two further ports respectively opening through the opposite end faces of said rotor, one of said further ports registering with the mouth of said first combustion chamber when one of said first-named ports registers with the mouth of said second combustion chamber and vice versa, and means driven in timed relation with said rotor to close direct communication between said pistons through said piston chamber at all times, while permitting said pistons to travel freely throughout the peripheral extent of said piston chamber.

5. A rotary internal combustion engine comprising block means formed to provide a rotor chamber defined between mutually-facing, parallel lands, and to define an annular piston chamber peripherally communicating with said rotor chamber, a rotor mounted to rotate in said rotor chamber with its opposed end faces cooperatively associated with said lands, respectively, each of said rotor end faces being formed with an axial socket, said block means being formed with a bore opening through the exterior thereof and through one of said lands on an axis coincident with the axis of said piston chamber, a first shaft journalled in said bore and having a chambered end snugly received in one of said rotor sockets, said block being formed with a second bore coaxial with said first-named bore and opening through the other of said lands, a second shaft journalled in said second bore and having a chambered end snugly received in the other of said rotor sockets, said block means further being formed with a fuel inlet port opening into said second bore and with an exhaust port opening into said first bore, said chambered shaft ends being ported to provide substantially continuous communication between the interiors of said shaft ends and said inlet and exhaust ports, respectively, during rotation of said shafts, a pair of pistons carried on the periphery of said rotor at peripherally spaced points to travel in said piston chamber, said rotor being formed to provide: a first passage leading from a point on the periphery of said rotor immediately behind one of said pistons into said second rotor socket and always in open communication with the interior of the chambered end of said second shaft, a second passage leading from a point on the periphery of said rotor immediately ahead of said one piston into said first rotor socket and always in open communication with the interior of the chambered end of said first shaft, a pair of apertured shutters mounted in said block means for rotation through separate paths, each intersecting said piston chamber at two points, means driven from said second shaft to rotate said shutters in timed relation with said rotor to close direct communication between said pistons through said piston chamber at all times, while permitting said pistons to travel freely throughout the peripheral extent of said piston chamber, and means for intermittently exploding a charge of fuel in said piston chamber behind the other of said pistons.

6. The engine of claim 5 in which each of said shutters is a circular plate mounted in a groove formed in said block means, said plates being rotatable about a common axis perpendicular to the axis of said piston chamber, and being equally and oppositely spaced from said piston chamber axis, the aperture in each of said plates having a peripheral extent of approximately 180°.

7. The engine of claim 6 in which said shutters are driven at an angular velocity twice that of said rotor.

8. The engine of claim 6 in which said means to rotate said shutters comprises a first gear fixed to rotate with said second shaft, a pair of countershafts mounted on fixed axes parallel with the axis of said second shaft and equally and oppositely spaced therefrom, a pinion fixed to rotate with each of said countershafts and meshing with said gear, a gear fixed to rotate with each of said countershafts, and a series of teeth on each of said shutters, each of said series meshing with one of said countershaft gears, the overall ratio of the train from said first-named gear to each of said shutters being two-to-one.

9. The engine of claim 4 in which each end face of said rotor is formed with a continuous groove near its peripheral boundary, a sinuous spring ring seated in the bottom of each such groove, a pair of split sealing rings telescopically associated with each other, seated in each groove upon the spring ring therein and projecting slightly from the corresponding rotor face, and cooperating means associated with each pair of sealing rings to restrain the same against registration of the splits therein.

10. The engine of claim 9 in which said cooperating means comprises a peripherally-elongated socket formed in a radial face of one of said rings, and a projection from the mating face of the other of said rings, said projection being received in said socket and being spaced from the split in its ring by a distance different from the distance by which any point in the length of said socket is spaced from the split in its ring.

11. The engine of claim 4 in which each of the ports in the end faces of said rotor is circumscribed by a groove concentric with, but spaced outwardly from, the boundary of its port, a sinuous spring ring seated in the bottom of each such groove, a pair of split sealing rings telescopically associated with each other, seated in each groove upon the spring ring therein and projecting slightly from the corresponding rotor face, and cooperating means associated with each pair of sealing rings to restrain the same against registration of the splits therein.

12. The engine of claim 11 in which each of said sealing rings is formed, in its edge facing said spring ring, with a notch, and in which said restraining means comprises a block received in both of said notches, said notches being differently spaced from the splits in their respective rings.

13. The engine of claim 12 in which the peripheral extent of at least one of said notches is greater than the peripheral extent of said block, whereby limited relative rotation of said sealing rings is permitted.

14. The engine of claim 5 in which each of said shafts is formed, between its portion received in a rotor socket and its ports, with an outwardly-opening, peripheral groove, a sinuous spring ring seated in the bottom of each such groove, a pair of split sealing rings seated, in axial, side-by-side relation, in each of said grooves upon the spring ring therein and projecting slightly radially from the external surface of said shaft, and cooperating means associated with each pair of sealing rings to restrain the same against registration of the splits therein.

15. The engine of claim 14 in which said cooperating means comprises a peripherally-elongated socket in an axial face of one ring of each pair, and a projection from the mating face of the other ring of each pair, said projection being received in said socket and being spaced from the split in its ring by a distance different from the distance by which any point in the length of said socket is spaced from the split in its ring.

16. A rotary internal combustion engine comprising block means formed to provide an annular piston chamber, a rotor journalled for rotation about the axis of said chamber, a pair of pistons mounted on said rotor in opposed relation to travel in said annular chamber, a pair of rotatable shutters, each having an aperture therein which traverses said piston chamber at two points in opposed quadrants of said piston chamber in timed relation to the travel of said pistons to permit successive passage of said pistons therethrough, said shutters and the apertures therein being so proportioned and spaced apart that, as the trailing end of the aperture in one of said shutters leaves one quadrant of said piston chamber, its leading end enters the opposed quadrant thereof, while the leading end of the aperture in the other shutter enters said one quadrant and its trailing end leaves said opposed quadrant, and means connecting said rotor to drive said shutters in such timed relation, each of said pistons being cylindrical in cross-section about an axis curved on an arc concentric with said rotor, and being received in a socket formed in the periphery of said rotor, each piston being formed to provide two axially-spaced, peripherally-extending, recessed ring seats, and a split sealing ring snugly received in each such seat, each ring being of continuously varying axial length to conform to its seat, and the splits in said respective rings being differently spaced from the regions of minimum length of their respective rings.

References Cited in the file of this patent

UNITED STATES PATENTS

| | | |
|---|---|---|
| 1,562,299 | Cundy | Nov. 17, 1925 |
| 1,713,378 | Engman | May 14, 1929 |
| 2,685,868 | Schrougham | Aug. 10, 1954 |